United States Patent
Johnston et al.

(10) Patent No.: US 9,525,718 B2
(45) Date of Patent: Dec. 20, 2016

(54) BACK-TO-BACK VIRTUAL WEB REAL-TIME COMMUNICATIONS (WEBRTC) AGENTS, AND RELATED METHODS, SYSTEMS, AND COMPUTER-READABLE MEDIA

(71) Applicant: Avaya Inc., Basking Ridge, NJ (US)

(72) Inventors: Alan B. Johnston, St. Louis, MO (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 183 days.

(21) Appl. No.: 13/931,970

(22) Filed: Jun. 30, 2013

(65) Prior Publication Data

US 2015/0006611 A1 Jan. 1, 2015

(51) Int. Cl.
*G06F 15/16* (2006.01)
*H04L 29/08* (2006.01)

(52) U.S. Cl.
CPC ..................................... *H04L 67/02* (2013.01)

(58) Field of Classification Search
None
See application file for complete search history.

(56) References Cited

U.S. PATENT DOCUMENTS

| | | | |
|---|---|---|---|
| 6,714,967 B1 | 3/2004 | Horvitz | |
| 7,107,316 B2 | 9/2006 | Brown et al. | |
| 7,145,898 B1 | 12/2006 | Elliott | |
| 7,266,591 B1 | 9/2007 | Johnston | |
| 7,379,993 B2 | 5/2008 | Valdes et al. | |

(Continued)

FOREIGN PATENT DOCUMENTS

| | | |
|---|---|---|
| EP | 1615386 A1 | 1/2006 |
| EP | 2529316 A2 | 12/2012 |

(Continued)

OTHER PUBLICATIONS

Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.

(Continued)

*Primary Examiner* — Ryan Jakovac
(74) *Attorney, Agent, or Firm* — Sheridan Ross P.C.

(57) ABSTRACT

Back-to-back Web Real-Time Communication (WebRTC) virtual agents, and related methods, systems, and computer-readable media are disclosed herein. In one embodiment, a method for providing back-to-back virtual WebRTC agents comprises receiving, by a WebRTC server executing on a computing device, a WebRTC offer/answer exchange between first and second WebRTC clients. The method further comprises instantiating one or more virtual WebRTC agents. The method also comprises establishing a first WebRTC interactive flow between the first WebRTC client and one of the one or more virtual WebRTC agents, and a second WebRTC interactive flow between the second WebRTC client and one of the one or more virtual WebRTC agents. The method additionally comprises directing a content of the first WebRTC interactive flow to the second WebRTC interactive flow, and a content of the second WebRTC interactive flow to the first WebRTC interactive flow, via the one or more virtual WebRTC agents.

20 Claims, 8 Drawing Sheets

(56) References Cited

U.S. PATENT DOCUMENTS

| | | |
|---|---|---|
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1 | 5/2014 | Lum et al. |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1* | 7/2014 | Li et al. .............................. 726/4 |
| 2014/0219167 A1* | 8/2014 | Santhanam ....... H04W 28/0268 370/328 |
| 2014/0222894 A1 | 8/2014 | Gangadharan et al. |
| 2014/0222930 A1 | 8/2014 | Gangadharan et al. |
| 2014/0223452 A1* | 8/2014 | Santhanam et al. .......... 719/328 |
| 2014/0237057 A1 | 8/2014 | Khodorenko |
| 2014/0241215 A1 | 8/2014 | Massover et al. |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1* | 9/2014 | Singh et al. ....................... 726/4 |
| 2014/0324979 A1 | 10/2014 | Gao et al. |
| 2014/0325078 A1 | 10/2014 | Shan et al. |
| 2014/0334169 A1* | 11/2014 | Ewert ............................ 362/485 |
| 2014/0348044 A1* | 11/2014 | Narayanan et al. .......... 370/310 |
| 2014/0365676 A1 | 12/2014 | Yoakum |
| 2014/0379931 A1* | 12/2014 | Gaviria ........................ 709/227 |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0026473 A1 | 1/2015 | Johnston et al. |
| 2015/0036690 A1 | 2/2015 | Pastro |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Search Report for British patent application GB1411584.4 mailed Dec. 30, 2014, 4 pages.

Search Report for British patent application GB1411580.2 mailed Dec. 30, 2014, 4 pages.

Non-Final Office Action for U.S. Appl. No. 13/931,968, mailed Dec. 8, 2014, 6 pages.

Non-Final Office Action for U.S. Appl. No. 13/835,913, mailed Nov. 20, 2014, 15 pages.

Non-Final Office Action for U.S. Appl. No. 13/803,292, mailed Jan. 27, 2015, 13 pages.

Non-Final Office Action for U.S. Appl. No. 14/050,891, mailed Jan. 29, 2015, 9 pages.

Non-Final Office Action for U.S. Appl. No. 13/955,023, mailed Feb. 2, 2015, 12 pages.

Andreasen et al., "Session Description Protocol (SDP): Security Descriptions for Media Streams," Network Working Group, Request for Comments: 4568, Standards Track, The Internet Society, Jul. 2006, 40 pages.

(56) References Cited

OTHER PUBLICATIONS

Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 mailed Mar. 14, 2014, 3 pages.
Search Report for British patent application GB1317122.8 mailed Mar. 11, 2014, 3 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusetts, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.

Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the Stun Protocol," Internet Engineering Task Force (IETF), Internet Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Extended European Search Report for European Patent Application 15161452.6, mailed Jun. 23, 2015, 5 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action and Examiner Initiated Interview Summary for U.S. Appl. No. 14/050,891, mailed Jun. 29, 2015, 11 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Search Report for British Patent Application No. GB1423089.0, mailed Jul. 6, 2015, 4 pages.

(56) References Cited

OTHER PUBLICATIONS

Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Author Unknown, "WebRTC," WebRTC.org, Date Accessed: Jan. 26, 2016, 4 pages, http://webrtc.org/.
Notice of Allowance for U.S. Appl. No. 13/863,662, mailed Feb. 1, 2016, 17 pages.
Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 14/174,371, mailed Feb. 18, 2016, 18 pages.

* cited by examiner

BACK-TO-BACK VIRTUAL WEB REAL-TIME COMMUNICATIONS (WEBRTC) AGENTS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive sessions.

Technical Background

Web Real-Time Communications (WebRTC) represents an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett (2012 Digital Codex LLC), which is incorporated herein in its entirety by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive session (e.g., a real-time video, audio, and/or data exchange), two web clients may retrieve WebRTC-enabled web applications, such as HTML5/JavaScript web applications, from a WebRTC application server. Through the web applications, the two web clients engage in a media negotiation to communicate and reach an agreement on parameters that define characteristics of the WebRTC interactive session. This media negotiation is known as a WebRTC "offer/answer" exchange. In an offer/answer exchange, a first web client operating on a sender computing device sends an "offer" to a second web client on a recipient computing device. The offer includes a WebRTC session description object that specifies media types and capabilities that the first web client supports and prefers for use in the WebRTC interactive session. The second web client then responds with a WebRTC session description object "answer" that indicates which of the offered media types and capabilities it supports and accepts for the WebRTC interactive session. Once the WebRTC offer/answer exchange is complete, the web clients may then establish a direct peer connection with one another, and may begin a real-time exchange of media or data. The peer connection between the web clients typically employs the Secure Real-time Transport Protocol (SRTP) to transport real-time media flows, and may utilize various other protocols for real-time data interchange.

However, a peer-to-peer architecture may not be optimal for real-time interaction in some circumstances. For instance, it may be necessary to provide recording or monitoring of the WebRTC interactive flow, and/or to address known incompatibilities between web clients at endpoints of the WebRTC interactive flow. The WebRTC standards provide for a WebRTC interactive flow to be routed through a TURN (Traversal Using Relay around NAT) server in situations in which a direct peer connection is not possible. However, a WebRTC interactive flow passing through a TURN server is encrypted, and thus cannot be examined or monitored at the TURN server. Moreover, converting a WebRTC interactive flow to a more easily manipulated format in real-time would require a gateway, which may be overly complex and/or commercially unavailable.

SUMMARY OF THE DETAILED DESCRIPTION

Embodiments disclosed in the detailed description provide back-to-back virtual Web Real-Time Communications (WebRTC) agents. Related methods, systems, and computer-readable media are also disclosed. In some embodiments, a WebRTC server, through which two or more WebRTC clients seek to establish a WebRTC interactive session, instantiates one or more virtual WebRTC agents. The WebRTC server may cause each of the two or more WebRTC clients to establish a WebRTC interactive flow with the one or more virtual WebRTC agents. The WebRTC server may then connect the virtual WebRTC agents "back-to-back" by directing the content of the established WebRTC interactive flows between or among the one or more virtual WebRTC agents. In this manner, the WebRTC server may provide a WebRTC interactive session for the two or more WebRTC clients, while also providing additional media processing functionality. As non-limiting examples, the media processing functionality may include recording and/or monitoring of the WebRTC interactive flows, extracting content from or injecting content into the WebRTC interactive flows, and/or resolving potential or actual incompatibilities between the WebRTC clients.

In this regard, in one embodiment, a method for providing a back-to-back virtual WebRTC agent is provided. The method comprises receiving, by a WebRTC server executing on a computing device, a WebRTC offer/answer exchange between a first WebRTC client and a second WebRTC client. The method further comprises instantiating one or more virtual WebRTC agents. The method also comprises establishing a first WebRTC interactive flow between the first WebRTC client and one of the one or more virtual WebRTC agents, and a second WebRTC interactive flow between the second WebRTC client and one of the one or more virtual WebRTC agents. The method additionally comprises directing a content of the first WebRTC interactive flow to the second WebRTC interactive flow and a content of the second WebRTC interactive flow to the first WebRTC interactive flow via the one or more virtual WebRTC agents.

In another embodiment, a system for providing a back-to-back virtual WebRTC agent is provided. The system comprises at least one communications interface, and a WebRTC server associated with the at least one communications interface. The WebRTC server comprises a WebRTC application provider configured to receive a WebRTC offer/answer exchange between a first WebRTC client and a second WebRTC client. The WebRTC server further comprises a virtual WebRTC agent manager. The virtual WebRTC agent manager is configured to instantiate one or more virtual WebRTC agents. The virtual WebRTC agent manager is further configured to establish a first WebRTC interactive flow between the first WebRTC client and one of the one or more virtual WebRTC agents, and a second WebRTC interactive flow between the second WebRTC client and one of the one or more virtual WebRTC agents. The virtual WebRTC agent manager is also configured to direct a content of the first WebRTC interactive flow to the second WebRTC interactive flow, and a content of the second WebRTC interactive flow to the first WebRTC interactive flow, via the one or more virtual WebRTC agents.

In another embodiment, a non-transitory computer-readable medium is provided. The non-transitory computer-readable medium has stored thereon computer-executable instructions to cause a processor to implement a method comprising receiving a WebRTC offer/answer exchange between a first WebRTC client and a second WebRTC client. The method implemented by the computer-executable instructions further comprises instantiating one or more virtual WebRTC agents. The method implemented by the computer-executable instructions also comprises establishing a first WebRTC interactive flow between the first WebRTC client and one of the one or more virtual WebRTC agents, and a second WebRTC interactive flow between the second WebRTC client and one of the one or more virtual WebRTC agents. The method implemented by the computer-executable instructions additionally comprises directing a content of the first WebRTC interactive flow to the second WebRTC interactive flow, and a content of the second WebRTC interactive flow to the first WebRTC interactive flow, via the one or more virtual WebRTC agents.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
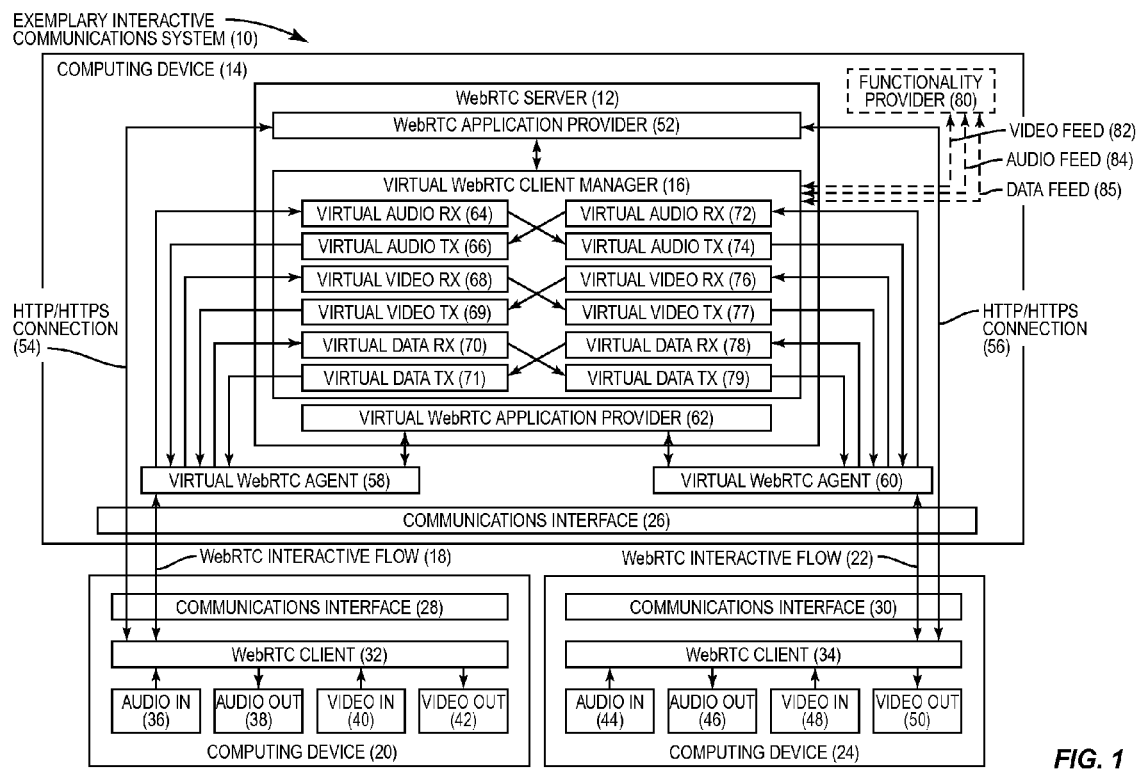
FIG. 1 is a conceptual diagram illustrating a Web Real-Time Communications (WebRTC) interactive session between two WebRTC clients via a WebRTC server including a virtual WebRTC agent manager and two back-to-back virtual WebRTC agents.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide back-to-back virtual Web Real-Time Communications (WebRTC) agents. Related methods, systems, and computer-readable media are also disclosed. In some embodiments, a WebRTC server, through which two or more WebRTC clients seek to establish a WebRTC interactive session, instantiates one or more virtual WebRTC agents. The WebRTC server may cause each of the two or more WebRTC clients to establish a WebRTC interactive flow with the one or more virtual WebRTC agents. The WebRTC server may then connect the virtual WebRTC agents "back-to-back" by directing the content of the established WebRTC interactive flows between or among the one or more virtual WebRTC agents. In this manner, the WebRTC server may provide a WebRTC interactive session for the two or more WebRTC clients, while also providing additional media processing functionality. As non-limiting examples, the media processing functionality may include recording and/or monitoring of the WebRTC interactive flows, extracting content from or injecting content into the WebRTC interactive flows, and/or resolving potential or actual incompatibilities between the WebRTC clients.

In this regard, in one embodiment, a method for providing a back-to-back virtual WebRTC agent is provided. The method comprises receiving, by a WebRTC server executing on a computing device, a WebRTC offer/answer exchange between a first WebRTC client and a second WebRTC client. The method further comprises instantiating one or more virtual WebRTC agents. The method also comprises establishing a first WebRTC interactive flow between the first WebRTC client and one of the one or more virtual WebRTC agents, and a second WebRTC interactive flow between the second WebRTC client and one of the one or more virtual WebRTC agents. The method additionally comprises directing a content of the first WebRTC interactive flow to the second WebRTC interactive flow, and a content of the second WebRTC interactive flow to the first WebRTC interactive flow, via the one or more virtual WebRTC agents.

FIG. 1 illustrates an exemplary interactive communications system 10 providing back-to-back virtual WebRTC agents as disclosed herein. In particular, the exemplary interactive communications system 10 provides a WebRTC server 12 that executes on a computing device 14, and that includes a virtual WebRTC agent manager 16. The virtual WebRTC agent manager 16 handles the instantiation of virtual WebRTC agents, and coordinates the establishing and directing of content of WebRTC interactive flows between virtual WebRTC agents to provide a WebRTC interactive session between two or more endpoints. As used herein, a "virtual WebRTC agent" refers to an instance of a browser or other WebRTC-enabled client application that executes on the computing device 14 under the control of the virtual WebRTC agent manager 16. A "WebRTC interactive session" refers to operations for carrying out a WebRTC offer/answer exchange, establishing a peer connection, and commencing a WebRTC interactive flow between two or more endpoints. A "WebRTC interactive flow," as disclosed herein, refers to an interactive media flow and/or an interactive data flow that passes between or among two or more endpoints according to the WebRTC standards and protocols. As non-limiting examples, an interactive media flow constituting a WebRTC interactive flow may comprise a real-time audio stream and/or a real-time video stream, or other real-time media or data streams. Data and/or media comprising a WebRTC interactive flow may be collectively referred to herein as "content."

For purposes of illustration, a WebRTC interactive flow 18 in FIG. 1 is shown as passing between the computing device 14 and a computing device 20, and a WebRTC interactive flow 22 is shown as passing between the computing device 14 and a computing device 24. It is to be understood that the computing devices 14, 20, and 24 may all be located within the same public or private network, or may be located within separate, communicatively coupled public or private networks. Some embodiments of the interactive communications system 10 of FIG. 1 may provide that each of the computing devices 14, 20, and 24 may be any computing device having network communications capabilities, such as a smartphone, a tablet computer, a dedicated web appliance, a media server, a desktop or server computer, or a purpose-built communications device, as non-limiting examples. The computing devices 14, 20, and 24 include communications interfaces 26, 28, and 30, respectively, for connecting the computing devices 14, 20, and 24 to one or more public and/or private networks. In some embodiments, the elements of the computing devices 14, 20, and 24 may be distributed across more than one computing device 14, 20, 24.

The computing devices 20 and 24 of FIG. 1 include WebRTC clients 32 and 34, respectively. Each of the WebRTC clients 32 and 34 may be a WebRTC-enabled web browser application, a dedicated communications application, a mobile application, or an interface-less application, such as a daemon or service application, as non-limiting examples. The WebRTC clients 32 and 34 implement the protocols, codecs, and Application Programming Interfaces (APIs) necessary to provide real-time WebRTC interactive sessions between the computing devices 20 and 24, respectively, and the computing device 14.

As seen in FIG. 1, the computing device 20 is communicatively coupled to an audio in device 36 (e.g., a microphone) for receiving audio input, and an audio out device 38 (for example, speakers or headphones) for generating audio output. The computing device 20 is further communicatively coupled to a video in device 40 (such as a camera, webcam, or other video source) for receiving video input, and a video out device 42 (e.g., a display) for displaying video output. Likewise, the computing device 24 is communicatively coupled to an audio in device 44, an audio out device 46, a video in device 48, and a video out device 50. The audio in devices 36 and 44, the audio out devices 38 and 46, the video in devices 40 and 48, and/or the video out devices 42 and 50 may be integrated into the respective computing devices 20 and 24, and/or they may be peripheral devices and/or virtual devices communicatively coupled to the respective computing devices 20 and 24. In some embodiments, the computing devices 20 and/or 24 may be communicatively coupled to more or fewer devices than illustrated in FIG. 1.

To establish a WebRTC interactive session, the WebRTC client 32 and the WebRTC client 34 download a WebRTC web application (not shown) from a WebRTC application provider 52 of the WebRTC server 12 via Hyper Text Transfer Protocol (HTTP)/Hyper Text Transfer Protocol Secure (HTTPS) connections 54 and 56. In some embodiments, the WebRTC web application may comprise an HTML5/JavaScript web application that provides a rich user interface using HTML5, and uses JavaScript to handle user input and to communicate with the WebRTC application provider 52. The WebRTC client 32 and the WebRTC client 34 then engage in a WebRTC offer/answer exchange by exchanging WebRTC session description objects (not shown) via the WebRTC application provider 52. The exchanged WebRTC session description objects are used to determine the media types and capabilities for the desired WebRTC interactive session.

In a typical peer-to-peer architecture, after the WebRTC offer/answer exchange is complete, a WebRTC interactive flow would be established directly between the WebRTC client 32 and the WebRTC client 34 via a peer connection. However, as noted above, a peer-to-peer architecture may not be optimal in some circumstances. For instance, a peer-to-peer architecture may cause recording or monitoring of the WebRTC interactive flow, and/or addressing incompatibilities between the WebRTC client 32 and the WebRTC client 34, to be difficult or impracticable.

In this regard, virtual WebRTC agents 58 and 60 are provided by the virtual WebRTC agent manager 16. In the example of FIG. 1, as the WebRTC application provider 52 receives the WebRTC offer/answer exchange from the WebRTC clients 32 and 34, the virtual WebRTC agent manager 16 instantiates the virtual WebRTC agents 58 and 60 corresponding to the WebRTC clients 32 and 34. In some embodiments, the virtual WebRTC agent manager 16 may instantiate the virtual WebRTC agents 58 and 60 by launching one or more instances of a WebRTC client such as a web browser on the computing device 14. Some embodiments may provide that the virtual WebRTC agents 58 and 60 are executed within a virtual instance of an operating system.

After instantiation, the virtual WebRTC agents 58 and 60 are each directed by the virtual WebRTC agent manager 16 to download a virtual WebRTC application (not shown) from a virtual WebRTC application provider 62. Some embodiments may provide that the virtual WebRTC application provider 62 is communicatively coupled to the virtual WebRTC agent manager 16. In some embodiments, the virtual WebRTC application provider 62 may be integrated into or otherwise constitute an element of the virtual WebRTC agent manager 16 and/or the WebRTC application provider 52. The virtual WebRTC application includes specialized instructions for interfacing with the WebRTC APIs of the virtual WebRTC agents 58 and 60. The virtual WebRTC agents 58 and 60 may communicate via the virtual WebRTC application with the WebRTC clients 32 and 34, respectively, and with the virtual WebRTC agent manager 16.

The virtual WebRTC agent manager 16 causes the virtual WebRTC agents 58 and 60 to establish the WebRTC interactive flows 18 and 22 with the corresponding WebRTC clients 32 and 34. In doing so, the virtual WebRTC agent manager 16 and/or the virtual WebRTC agents 58 and 60 may modify the data being passed between the WebRTC clients 32 and 34 to facilitate the establishment of the WebRTC interactive flows 18 and 22. For example, data related to the location and/or identity of the endpoints of each of the WebRTC interactive flows 18 and 22 may be modified to permit the virtual WebRTC agents 58 and 60 to act as proxies for their corresponding WebRTC clients 32 and 34.

The virtual WebRTC agent manager 16 then connects the virtual WebRTC agents 58 and 60 "back-to-back" (i.e., the content output by the WebRTC interactive flow 18 of the virtual WebRTC agent 58 is directed as input into the WebRTC interactive flow 22 of the virtual WebRTC agent 60, and vice versa). To accomplish a "back-to-back" connection, the virtual WebRTC agent manager 16 provides a virtual audio receiver 64 (Rx), a virtual audio transmitter (Tx) 66, a virtual video receiver (Rx) 68, a virtual video transmitter (Tx) 69, a virtual data receiver (Rx) 70, and a virtual data transmitter (Tx) 71 to which the virtual WebRTC agent 58 is communicatively coupled. Likewise, the virtual WebRTC agent 60 is communicatively coupled to a virtual audio receiver (Rx) 72, a virtual audio transmitter (Tx) 74, a virtual video receiver (Rx) 76, a virtual video transmitter (Tx) 77, a virtual data receiver (Rx) 78, and a virtual data transmitter (Tx) 79 provided by the virtual WebRTC agent manager 16. As the WebRTC interactive flows 18 and 22 commence, the virtual WebRTC agents 58 and 60 forward audio signals received from the corresponding WebRTC interactive flows 18 and 22 to the virtual audio receivers 64 and 72. The virtual WebRTC agents 58 and 60 also forward video signals received from the corresponding WebRTC interactive flows 18 and 22 to the virtual video receivers 68 and 76, and forward data received from the corresponding WebRTC interactive flows 18 and 22 to the data receivers 70 and 78.

The virtual audio receiver 64 that is communicatively coupled to the virtual WebRTC agent 58 is configured to direct audio signals received from the virtual WebRTC agent 58 to the virtual audio transmitter 74 that is communicatively coupled to the virtual WebRTC agent 60. The virtual video receiver 68 that is communicatively coupled to the virtual WebRTC agent 58 is configured to direct video signals received from the virtual WebRTC agent 58 to the virtual video transmitter 77 that is communicatively coupled to the virtual WebRTC agent 60. The virtual data receiver 70 that is communicatively coupled to the virtual WebRTC agent 58 is configured to direct data received from the virtual WebRTC agent 58 to the virtual data transmitter 79 that is communicatively coupled to the virtual WebRTC agent 60. Likewise, the virtual audio receiver 72 that is communicatively coupled to the virtual WebRTC agent 60 is configured to direct audio signals received from the virtual WebRTC agent 60 to the virtual audio transmitter 66 that is communicatively coupled to the virtual WebRTC agent 58. The virtual video receiver 76 that is communicatively coupled to the virtual WebRTC agent 60 is configured to direct video signals received from the virtual WebRTC agent 60 to the virtual video transmitter 69 that is communicatively coupled to the virtual WebRTC agent 58. The virtual data receiver 78 that is communicatively coupled to the virtual WebRTC agent 60 is configured to direct data received from the virtual WebRTC agent 60 to the virtual data transmitter 71 that is communicatively coupled to the virtual WebRTC agent 60.

From the perspective of the WebRTC clients 32 and 34, the resulting WebRTC interactive session including the WebRTC interactive flows 18 and 22 appears no different from a WebRTC interactive session transported over a direct peer connection. During the resulting WebRTC interactive session, the virtual WebRTC agent manager 16 may extract content from the WebRTC interactive flow 18 and/or the WebRTC interactive flow 22 by accessing an input from the virtual audio receivers 64 and/or 72, the virtual video receivers 68 and/or 76, and/or the virtual data receivers 70 and/or 78. The virtual WebRTC agent manager 16 may also inject content into the WebRTC interactive flow 18 and/or the WebRTC interactive flow 22 by modifying an output from the virtual audio transmitters 66 and/or 74, the virtual video transmitters 70 and/or 78, and/or the virtual data transmitters 71 and 79. Thus, some embodiments may provide that content may be extracted from or injected into the WebRTC interactive flow 18 and/or the WebRTC interactive flow 22. In some embodiments, content from the WebRTC interactive flow 18 and/or the WebRTC interactive flow 22 may be recorded or transformed by the virtual WebRTC agent manager 16.

In some embodiments, content from the WebRTC interactive flow 18 and/or the WebRTC interactive flow 22 may be optionally directed to or received from a functionality provider 80 as indicated by bidirectional video feed 82, bidirectional audio feed 84, and bidirectional data feed 85. The functionality provider 80 may provide additional media processing functionality, such as recording or transforming content of the WebRTC interactive flow 18 and/or the WebRTC interactive flow 22. In some embodiments, the media processing functionality provider 80 may provide content, such as audio or video announcements, to be injected into the WebRTC interactive flow 18 and/or the WebRTC interactive flow 22.

In the example of FIG. 1, the two virtual WebRTC agents 58 and 60 are instantiated by the virtual WebRTC agent manager 16. This may be useful in circumstances such as where the WebRTC client 32 and the WebRTC client 34 are known to be incompatible or have limited compatibility. As a non-limiting example, the WebRTC clients 32 and 34 may be web browsers having differing levels of support for the WebRTC APIs. To remedy such incompatibilities, the specific client type and/or client version of the WebRTC client 32 and/or the WebRTC client 34 may be determined by the WebRTC application provider 52 and/or the virtual WebRTC agent manager 16. In some embodiments, the client type and/or client version of the WebRTC client 32 and/or the WebRTC client 34 may be determined based on data received as part of a WebRTC offer/answer exchange, a query/response exchange between the virtual WebRTC agent manager 16 and the WebRTC client 32 and/or the WebRTC client 34, an HTTP header, or other data provided by the WebRTC client 32 and/or the WebRTC client 34. The virtual WebRTC agent manager 16 may then instantiate the virtual WebRTC agents 58 and 60 having a client type and/or version corresponding to the client type and/or version of the WebRTC clients 32 and 34 respectively. Because each of the WebRTC clients 32 and 34 directly communicates with a virtual WebRTC agent of the same type and version, incompatibilities between the WebRTC clients 32 and 34 may be resolved.

Conversely, in situations in which the WebRTC clients 32 and 34 are known to be compatible, the virtual WebRTC agent manager 16 may provide a WebRTC interactive session between the WebRTC clients 32 and 34 using a single virtual WebRTC agent. Providing a single virtual WebRTC agent may conserve computing resources of the computing device 14 and increase the scalability of the WebRTC server 12. This embodiment is discussed in greater detail below with respect to FIG. 4.

Figure 2:
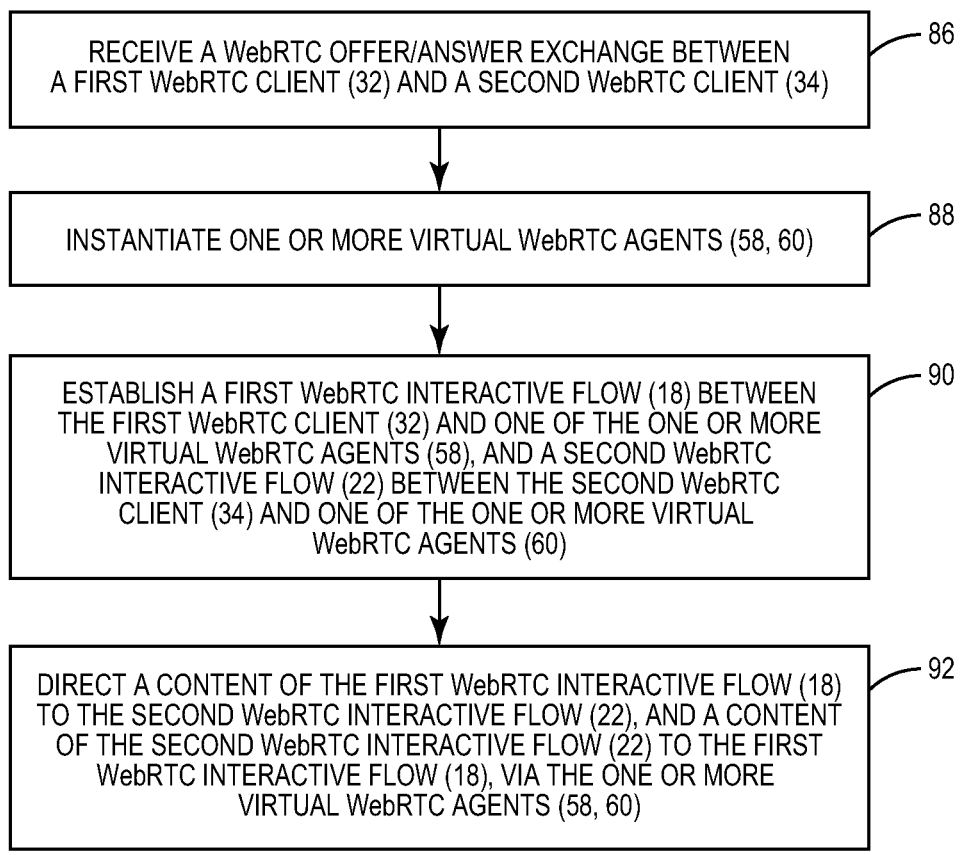
FIG. 2 is a flowchart illustrating exemplary operations of the WebRTC server and the virtual WebRTC agent manager of FIG. 1 for providing back-to-back virtual WebRTC agents.

To generally describe exemplary operations of the WebRTC application provider 52 and the virtual WebRTC agent manager 16 of FIG. 1 for providing back-to-back virtual WebRTC agents, FIG. 2 is provided. For the sake of clarity, elements of FIG. 1 are referenced in describing FIG. 2. In the example of FIG. 2, operations begin with the WebRTC application provider 52 receiving a WebRTC offer/answer exchange between a first WebRTC client 32 and a second WebRTC client 34 (block 86). In some embodiments, the WebRTC offer/answer includes an exchange of WebRTC session description objects that may be used to determine the media types and capabilities of the first WebRTC client 32 and the second WebRTC client 34 for the desired WebRTC interactive session.

The virtual WebRTC agent manager 16 next instantiates one or more virtual WebRTC agents 58 and 60 (block 88). Some embodiments may provide that a single virtual WebRTC agent is instantiated if the first WebRTC client 32 and the second WebRTC client 34 are determined to be compatible. In some embodiments, a virtual WebRTC agent may be established for each of the first WebRTC client 32 and the second WebRTC client 34 if the first WebRTC client 32 and the second WebRTC client 34 are determined to be incompatible. As a non-limiting example, the virtual WebRTC agent manager 16 may instantiate the one or more virtual WebRTC agents 58 and 60 by launching one or more instances of a WebRTC client, such as a web browser, on the computing device 14.

The virtual WebRTC agent manager 16 then establishes a first WebRTC interactive flow 18 between the first WebRTC client 32 and one of the one or more virtual WebRTC agents (e.g., the virtual WebRTC agent 58), and a second WebRTC interactive flow 22 between the second WebRTC client 34 and one of the one or more virtual WebRTC agents (e.g., the virtual WebRTC agent 60) (block 90). According to some embodiments herein, the virtual WebRTC agent manager 16 and/or the virtual WebRTC agents 58 and 60 may modify the data being passed between the WebRTC clients 32 and 34 to facilitate the establishment of the WebRTC interactive flows 18 and 22. For example, data relating to the location and/or identity of the endpoints of each of the WebRTC interactive flows 18 and 22 may be modified to permit the virtual WebRTC agents 58 and 60 to act as proxies for their corresponding WebRTC clients 32 and 34.

The virtual WebRTC agent manager 16 next directs a content of the first WebRTC interactive flow 18 to the second WebRTC interactive flow 22, and a content of the second WebRTC interactive flow 22 to the first WebRTC interactive flow 18 via the one or more virtual WebRTC agents 58 and 60 (block 92). This results in a "back-to-back" connection between the one or more virtual WebRTC agents 58 and 60. In some embodiments, this may be accomplished through the use of virtual audio receivers and transmitters, virtual video receivers and transmitters, and virtual data receivers and transmitters provided by the virtual WebRTC agent manager 16, as illustrated in FIG. 1.

Figure 3:
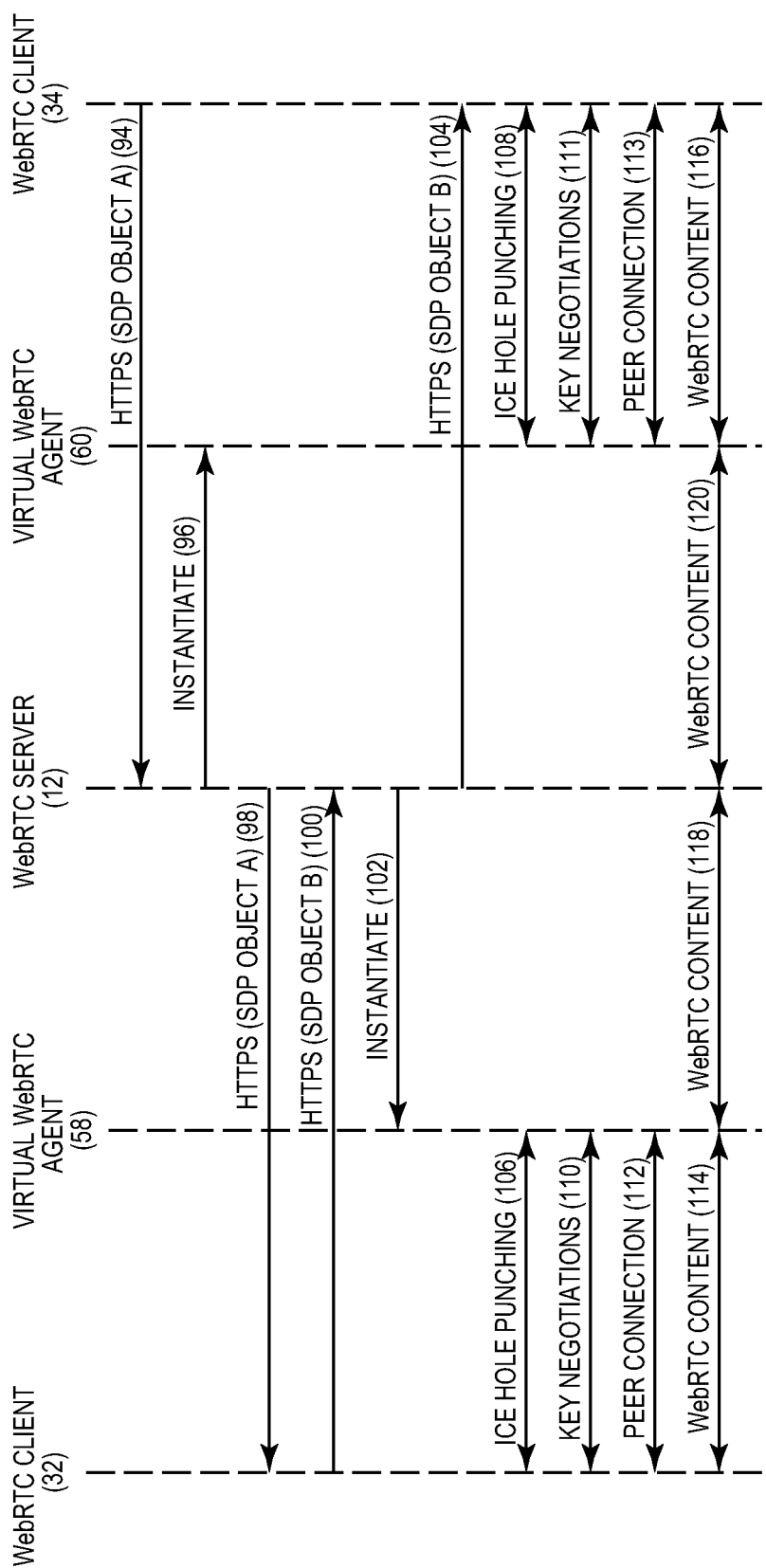
FIG. 3 is a diagram illustrating exemplary communications flows within an exemplary system including the virtual WebRTC agent manager and back-to-back virtual WebRTC agents of FIG. 1.

To illustrate exemplary communications flows during the establishment of a WebRTC interactive session using the virtual WebRTC agents 58 and 60 of FIG. 1, FIG. 3 is provided. In FIG. 3, the WebRTC client 32, the virtual WebRTC agent 58, the WebRTC server 12, the virtual WebRTC agent 60, and the WebRTC client 34 of FIG. 1 are each represented by vertical dotted lines. It is to be understood that the WebRTC server 12 includes the WebRTC application provider 52 and the virtual WebRTC agent manager 16, which for the sake of clarity are omitted from this example. It is to be further understood for this example that the WebRTC client 32 and the WebRTC client 34 have each downloaded a WebRTC-enabled web application, such as an HTML5/JavaScript WebRTC application, from the WebRTC server 12.

As seen in FIG. 3, the establishment of a WebRTC interactive session via the virtual WebRTC agents 58 and 60 begins with the WebRTC client 34 sending a session description object (SDP) to the WebRTC server 12 (in this example, via an HTTPS connection). The WebRTC session description object is referred to as SDP Object A and is indicated by arrow 94. SDP Object A represents the "offer" in a WebRTC offer/answer exchange, and specifies the media types and capabilities that the WebRTC client 34 supports and prefers for use in the WebRTC interactive session.

The WebRTC server 12 (i.e., the virtual WebRTC agent manager 16) instantiates the virtual WebRTC agent 60 corresponding to the WebRTC client 34, as indicated by arrow 96. In some embodiments, a client type and/or a client version of the WebRTC client 34 may be determined based on the SDP Object A, a query/response exchange between the WebRTC server 12 and the WebRTC client 34, an HTTP header, or other data provided by the WebRTC client 34. The virtual WebRTC agent 60 may be instantiated having a client type and/or a client version that is known to be compatible with the WebRTC client 34. The WebRTC server 12 then forwards the SDP Object A to the WebRTC client 32, as indicated by arrow 98.

After the WebRTC client 32 receives the SDP Object A from the WebRTC server 12, the WebRTC client 32 in response sends a WebRTC session description object, referred to as SDP Object B, via HTTPS to the WebRTC server 12, as indicated by arrow 100. The SDP Object B in this example represents the "answer" in the WebRTC offer/answer exchange. The WebRTC server 12 (i.e., the virtual WebRTC agent manager 16) then instantiates the virtual WebRTC agent 58 corresponding to the WebRTC client 32, as indicated by arrow 102. Some embodiments may provide that a client type and/or a client version of the WebRTC client 32 may be determined based on the SDP Object B, a query/response exchange between the virtual WebRTC agent manager 16 and the WebRTC client 32, an HTTP header, or other data provided by the WebRTC client 32. The virtual WebRTC agent 58 may be instantiated having a client type and/or a client version known to be compatible with the WebRTC client 32. The WebRTC server 12, in turn, forwards the SDP Object B to the WebRTC client 34, as shown by arrow 104.

With continuing reference to FIG. 3, the WebRTC client 32 and the WebRTC client 34 then begin "hole punching" to determine the best way to establish direct communications with the virtual WebRTC agents 58 and 60, respectively. This is indicated by bidirectional arrows 106 and 108 in FIG. 3. Hole punching is a technique, often using protocols such as Interactive Connectivity Establishment (ICE), in which both of the WebRTC clients 32 and 34 establish a connection with an unrestricted third-party server (not shown) that uncovers external and internal address information for use in direct communications.

Once the ICE hole punching indicated by arrows 106 and 108 is successful, the WebRTC client 32 and the WebRTC client 34 begin key negotiations to establish a secure peer connection. In a typical peer-to-peer architecture, the key negotiations take place directly between the WebRTC client 32 and the WebRTC client 34. However, in this example, each of the WebRTC clients 32 and 34 negotiates with its corresponding virtual WebRTC agent 58 and 60, as indicated by bidirectional arrows 110 and 111. If key negotiations are successfully concluded, peer connections are established between the WebRTC client 32 and the virtual WebRTC agent 58, and between the WebRTC client 34 and the virtual WebRTC agent 60, as indicated by bidirectional arrows 112 and 113.

Upon establishing peer connections with their corresponding virtual WebRTC agents 58 and 60, the WebRTC client 32 and the WebRTC client 34 begin exchanging WebRTC media and/or data flows. As seen in FIG. 3, the WebRTC media and/or data flows pass from the WebRTC clients 32 and 34 to their respective virtual WebRTC agents 58 and 60, as indicated by bidirectional arrows 114 and 116. The virtual WebRTC agents 58 and 60 then send the content of the WebRTC interactive flows 18 and 22 through the WebRTC server 12, as shown by bidirectional arrows 118 and 120. In this manner, the WebRTC server 12 may selectively control, monitor, and/or modify a content of WebRTC interactive flows 18 and 22 between the WebRTC clients 32 and 34.

Figure 4:
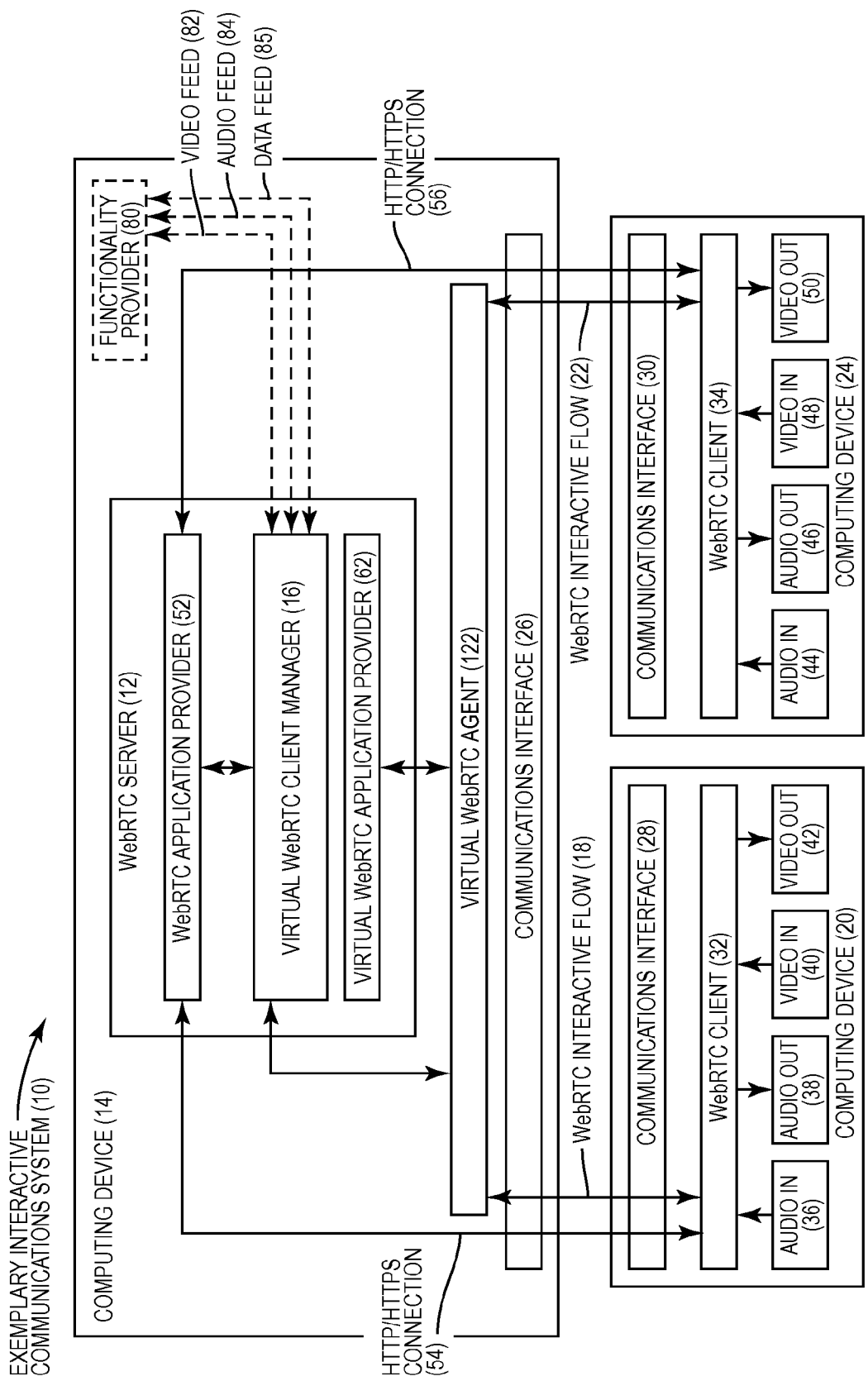
FIG. 4 is a conceptual diagram illustrating a WebRTC interactive session between two WebRTC clients utilizing a single virtual WebRTC agent managed by a virtual WebRTC agent manager.

As noted above with respect to FIG. 1, the virtual WebRTC agent manager 16 may enable a WebRTC interactive session between the WebRTC clients 32 and 34 using a single virtual WebRTC agent if the WebRTC clients 32 and 34 are known to be compatible. To illustrate this embodiment, FIG. 4 is provided. In FIG. 4, the exemplary interactive communications system 10 of FIG. 1 is shown. In this example, however, it is assumed that the WebRTC clients 32 and 34 are known to be compatible. For instance, the WebRTC clients 32 and 34 may be WebRTC-enabled web browsers of the same type and version. Thus, in the embodiment of FIG. 4, the virtual WebRTC agent manager 16 instantiates a single virtual WebRTC agent 122 to which both of the WebRTC clients 32 and 34 may connect. The virtual WebRTC agent 122 downloads a virtual WebRTC application (not shown) from the virtual WebRTC application provider 62. The virtual WebRTC application may contain specialized instructions for enabling the virtual WebRTC agent 122 to communicate with the WebRTC clients 32 and 34 and with the virtual WebRTC agent manager 16. In some embodiments, the virtual WebRTC application may enable the virtual WebRTC agent manager 16 to control how the virtual WebRTC agent 122 directs audio and/or video data to the WebRTC clients 32 and 34.

In the example of FIG. 4, the virtual WebRTC agent manager 16 causes the virtual WebRTC agent 122 to establish the WebRTC interactive flows 18 and 22 with the WebRTC clients 32 and 34. The virtual WebRTC agent 122 may then employ its built-in WebRTC APIs to direct a content of the WebRTC interactive flow 18 to the WebRTC interactive flow 22, and vice versa. The virtual WebRTC agent 122 may also direct a content of the WebRTC interactive flow 18 and/or the WebRTC interactive flow 22 to the virtual WebRTC agent manager 16. During the resulting WebRTC interactive session, the virtual WebRTC agent manager 16 may extract content from the WebRTC interactive flow 18 and/or the WebRTC interactive flow 22 by accessing content sent from the virtual WebRTC agent 122. For example, content from the WebRTC interactive flow 18 and/or the WebRTC interactive flow 22 may be recorded or transformed by the virtual WebRTC agent manager 16 or by the functionality provider 80. The virtual WebRTC agent manager 16 may also direct the virtual WebRTC agent 122 to inject content into the WebRTC interactive flow 18 and/or the WebRTC interactive flow 22.

Figure 5A:
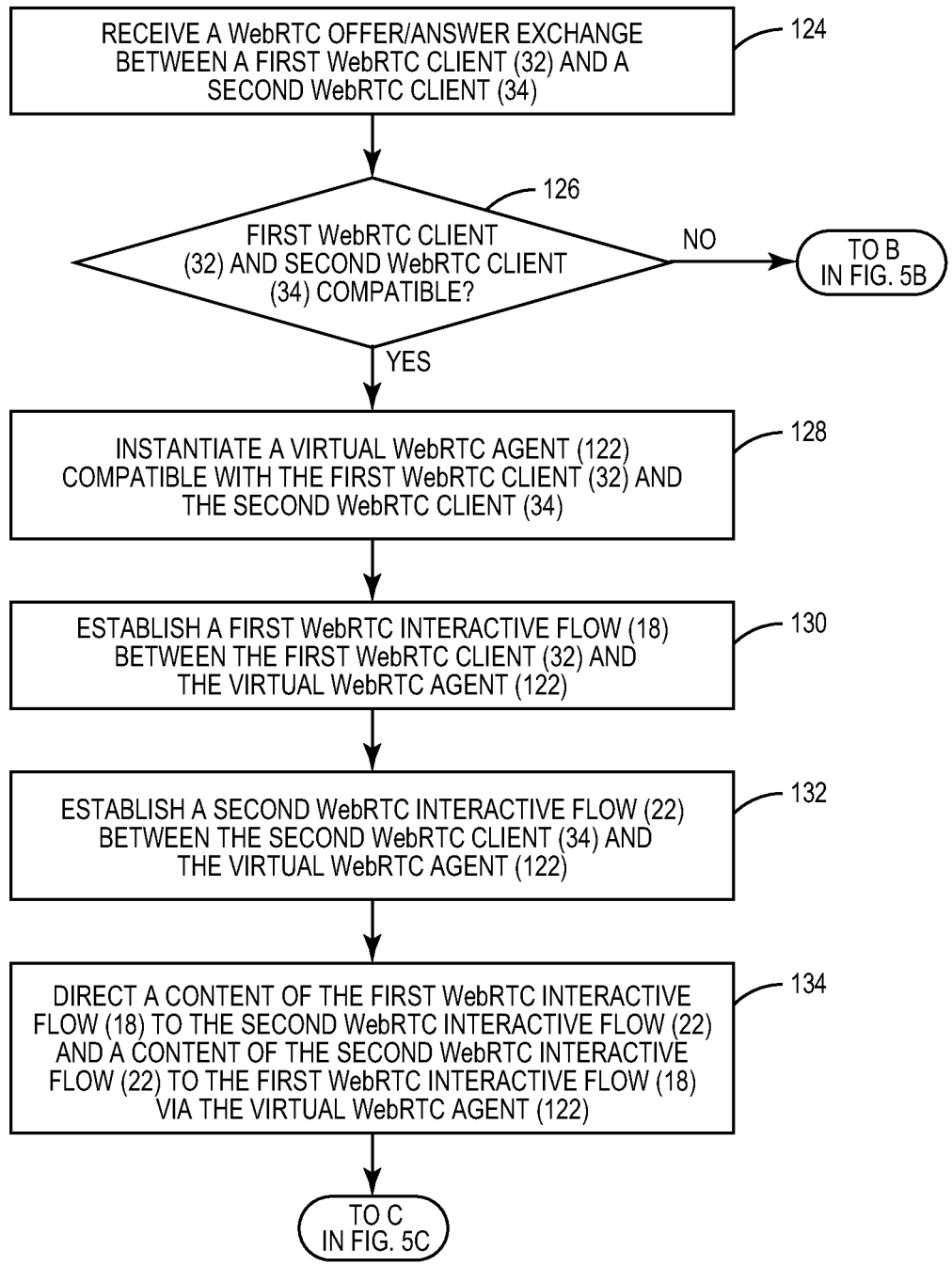
FIGS. 5A-5C are flowcharts illustrating more detailed exemplary operations for providing back-to-back virtual WebRTC agents and additional media processing functionality.
Figure 5B:
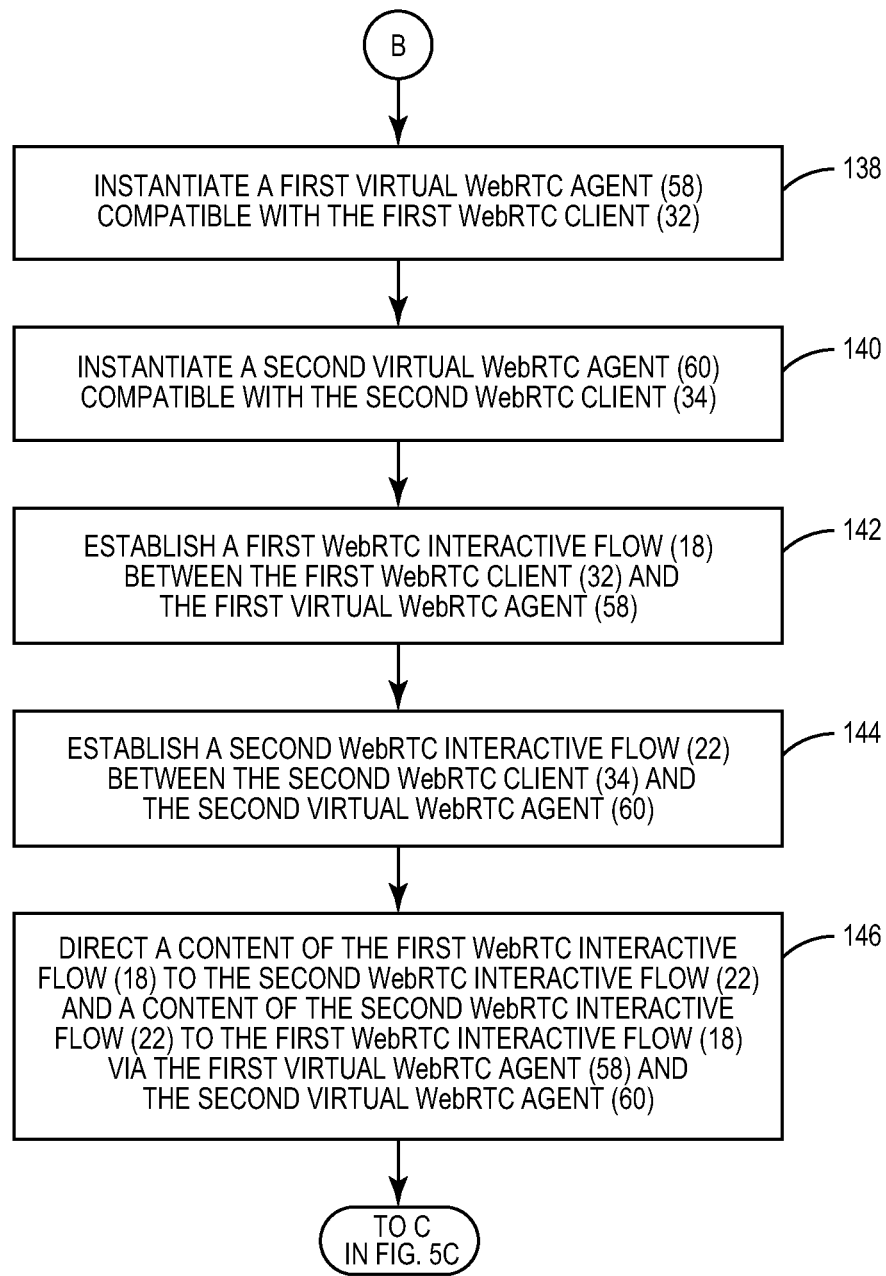
Figure 5C:
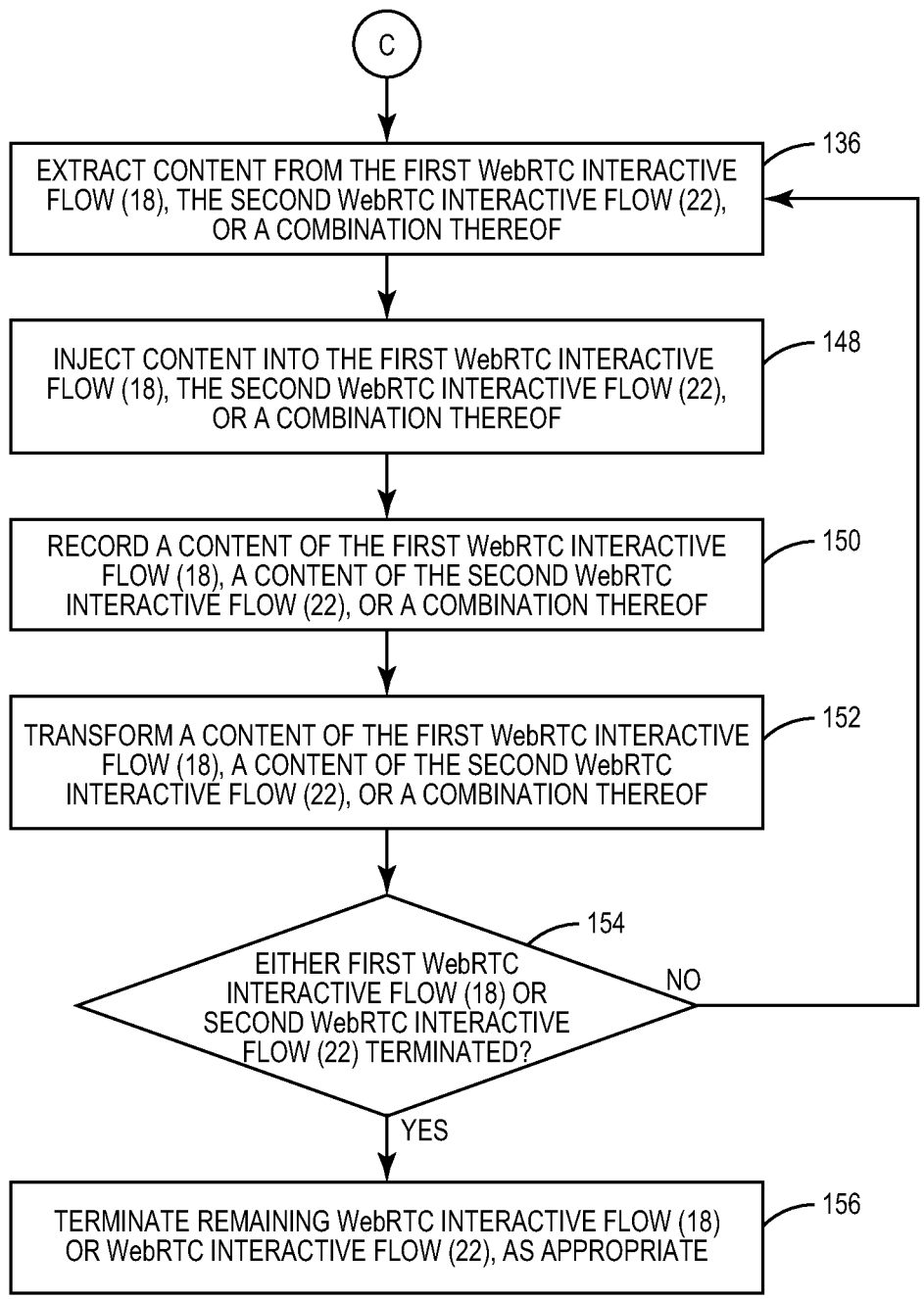

FIGS. 5A-5C are provided to illustrate in greater detail an exemplary generalized process for the WebRTC application provider 52 and the virtual WebRTC agent manager 16 of FIG. 1 to provide back-to-back virtual WebRTC agents. For illustrative purposes, FIGS. 5A-5C refer to elements of the exemplary interactive communications system 10 of FIGS. 1 and 4. FIG. 5A details operations for determining the compatibility of the WebRTC clients 32, 34 seeking to establish a WebRTC interactive session, and providing a virtual WebRTC agent 122 if the WebRTC clients 32, 34 are compatible. FIG. 5B shows operations for providing multiple virtual WebRTC agents 58, 60 in a situation in which the WebRTC clients 32, 34 are not compatible, or if for some other reason multiple virtual clients are desirable. FIG. 5C illustrates operations for providing additional functionality including extracting content from, injecting content into, recording, and/or transforming the content of the WebRTC interactive flows 18, 22.

In FIG. 5A, processing begins with the WebRTC application provider 52 receiving a WebRTC offer/answer exchange between a first WebRTC client 32 and a second WebRTC client 34 (block 124). Based on the WebRTC offer/answer exchange, the virtual WebRTC agent manager 16 determines whether the first WebRTC client 32 and the second WebRTC client 34 are known to be compatible (block 126). In some embodiments, determining a compatibility of the first WebRTC client 32 and the second WebRTC client 34 may include comparing a client type and/or a client version of each of the first WebRTC client 32 and the second WebRTC client 34.

If the first WebRTC client 32 and the second WebRTC client 34 are determined to be compatible, the virtual WebRTC agent manager 16 may enable a WebRTC interactive session between the first WebRTC client 32 and the second WebRTC client 34 using a single virtual WebRTC agent 122, as discussed above with respect to FIG. 4. Accordingly, the virtual WebRTC agent manager 16 instantiates a virtual WebRTC agent 122 that is compatible with both the first WebRTC client 32 and the second WebRTC client 34 (block 128). As a non-limiting example, the virtual WebRTC agent manager 16 may execute a WebRTC client of the same client type and/or version as the first WebRTC client 32 and/or the second WebRTC client 34. The virtual WebRTC agent manager 16 then establishes a first WebRTC interactive flow 18 between the first WebRTC client 32 and the virtual WebRTC agent 122 (block 130). The virtual WebRTC agent manager 16 also establishes a second WebRTC interactive flow 22 between the second WebRTC client 34 and the virtual WebRTC agent 122 (block 132). The virtual WebRTC agent manager 16 directs a content of the first WebRTC interactive flow 18 to the second WebRTC interactive flow 22, and a content of the second WebRTC interactive flow 22 to the first WebRTC interactive flow 18 via the virtual WebRTC agent 122 (block 134). In this manner, the virtual WebRTC agent 122 may enable a WebRTC interactive session between the WebRTC clients 32 and 34, while minimizing the use of computing resources. Processing then resumes at block 136 of FIG. 5C.

Returning to decision block 126 of FIG. 5A, if the virtual WebRTC agent manager 16 determines that the first WebRTC client 32 and the second WebRTC client 34 are not fully compatible, the virtual WebRTC agent manager 16 may enable a WebRTC interactive session between the first WebRTC client 32 and the second WebRTC client 34 using two virtual WebRTC agents 58 and 60, as discussed above with respect to FIG. 1. Accordingly, processing resumes at block 138 of FIG. 5B. The virtual WebRTC agent manager 16 instantiates the first virtual WebRTC agent 58 that is compatible with the first WebRTC client 32 (block 138). The virtual WebRTC agent manager 16 also instantiates the second virtual WebRTC agent 60 that is compatible with the second WebRTC client 34 (block 140). In some embodiments, the virtual WebRTC agents 58 and 60 have a same client type and/or client version as the WebRTC clients 32 and 34, respectively.

The virtual WebRTC agent manager 16 then establishes a first WebRTC interactive flow 18 between the first WebRTC client 32 and the first virtual WebRTC agent 58 (block 142). The virtual WebRTC agent manager 16 also establishes a second WebRTC interactive flow 22 between the second WebRTC client 34 and the second virtual WebRTC agent 60 (block 144). Because each of the first WebRTC client 32 and the second WebRTC client 34 are interacting directly with their respective compatible virtual WebRTC agents 58 and 60, no compatibility issues should arise with respect to the WebRTC interactive flows 18 and 22.

The virtual WebRTC agent manager 16 then directs a content of the first WebRTC interactive flow 18 to the second WebRTC interactive flow 22, and a content of the second WebRTC interactive flow 22 to the first WebRTC interactive flow 18 via the first virtual WebRTC agent 58 and the second virtual WebRTC agent 60 (block 146). In this manner, the virtual WebRTC agents 58 and 60 are connected "back-to-back," such that the audio, video, and/or data outputs of the virtual WebRTC agent 58 become inputs to the virtual WebRTC agent 60, and vice versa. Processing then resumes at block 136 of FIG. 5C.

Referring now to FIG. 5C, the virtual WebRTC agent manager 16 at this point may access the contents of the first WebRTC interactive flow 18 and the second WebRTC interactive flow 22, and may provide additional media processing functionality. For example, in some embodiments, the virtual WebRTC agent manager 16 may extract content from the first WebRTC interactive flow 18, the second WebRTC interactive flow 22, or a combination thereof (block 136). Some embodiments may provide that the virtual WebRTC agent manager 16 may inject content into the first WebRTC interactive flow 18, the second WebRTC interactive flow 22, or a combination thereof (block 148). For example, the virtual WebRTC agent manager 16 may insert additional audio, video, and/or data into the WebRTC interactive flows 18 and/or 22. According to some embodiments, the virtual WebRTC agent manager 16 may record a content of the first WebRTC interactive flow 18, a content of the second WebRTC interactive flow 22, or a combination thereof (block 150). In some embodiments, the virtual WebRTC agent manager 16 may transform a content of the first WebRTC interactive flow 18, a content of the second WebRTC interactive flow 22, or a combination thereof (block 152).

The virtual WebRTC agent manager 16 then determines whether either of the first WebRTC interactive flow 18 or the second WebRTC interactive flow 22 has been terminated (block 154). If both the first WebRTC interactive flow 18 and the second WebRTC interactive flow 22 are still active, processing returns to block 136 of FIG. 5C. Otherwise, the virtual WebRTC agent manager 16 terminates the remaining active WebRTC interactive flow 18 or 22, as appropriate (block 156).

Figure 6:
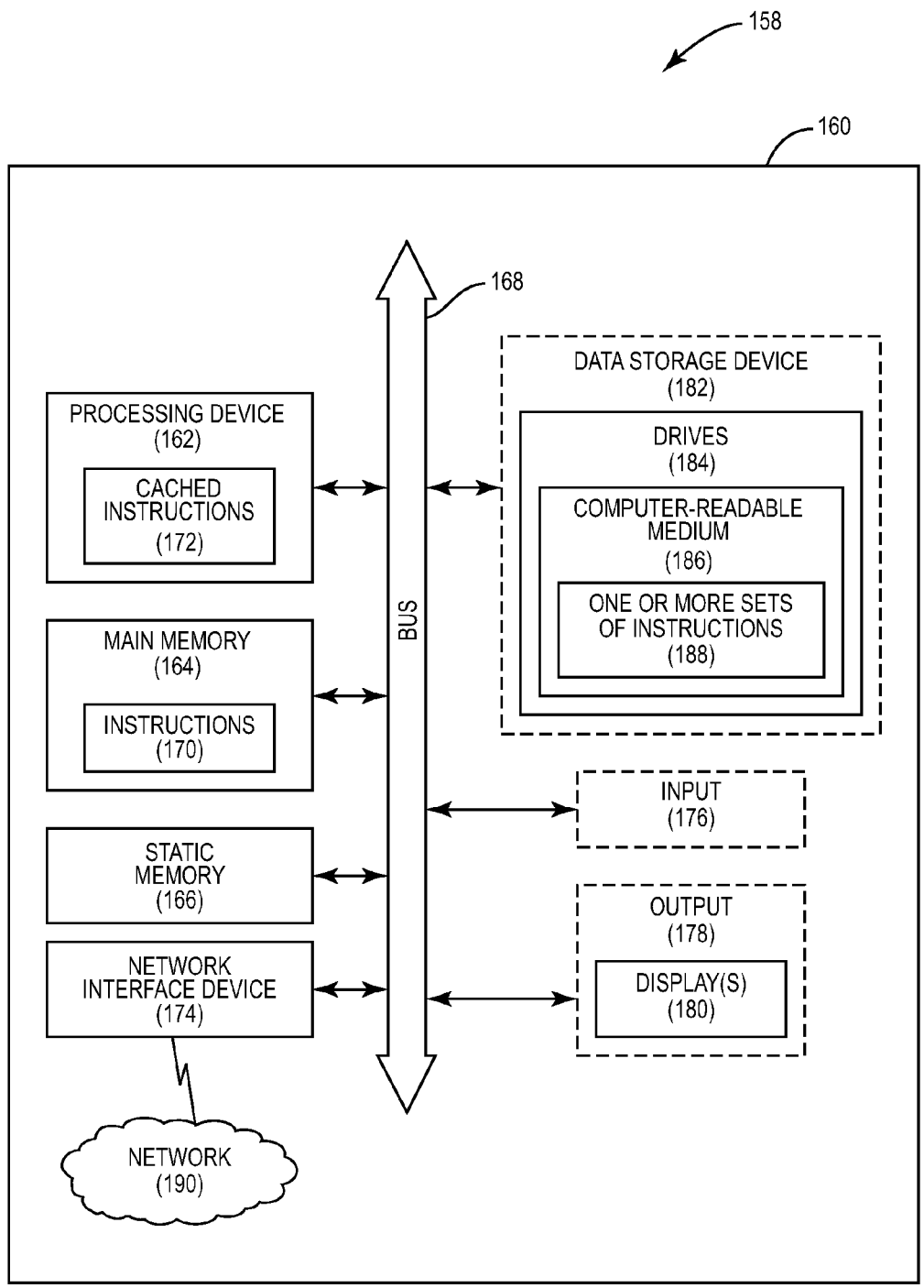
FIG. 6 is a block diagram of an exemplary processor-based system that may include the WebRTC server and the virtual WebRTC agent manager of FIG. 1.

FIG. 6 provides a schematic diagram representation of a processing system 158 in the exemplary form of an exemplary computer system 160 adapted to execute instructions to perform the functions described herein. In some embodiments, the processing system 158 may execute instructions to perform the functions of the WebRTC application provider 52 and the virtual WebRTC agent manager 16 of FIG. 1. In this regard, the processing system 158 may comprise the computer system 160, within which a set of instructions for causing the processing system 158 to perform any one or more of the methodologies discussed herein may be executed. The processing system 158 may be connected (as a non-limiting example, networked) to other machines in a local area network (LAN), an intranet, an extranet, or the Internet. The processing system 158 may operate in a client-server network environment, or as a peer machine in a peer-to-peer (or distributed) network environment. While only a single processing system 158 is illustrated, the terms "controller" and "server" shall also be taken to include any collection of machines that individually or jointly execute a set (or multiple sets) of instructions to perform any one or more of the methodologies discussed herein. The processing system 158 may be a server, a personal computer, a desktop computer, a laptop computer, a personal digital assistant (PDA), a computing pad, a mobile device, or any other device and may represent, as non-limiting examples, a server or a user's computer.

The exemplary computer system 160 includes a processing device or processor 162, a main memory 164 (as non-limiting examples, read-only memory (ROM), flash memory, dynamic random access memory (DRAM) such as synchronous DRAM (SDRAM), etc.), and a static memory 166 (as non-limiting examples, flash memory, static random access memory (SRAM), etc.), which may communicate with each other via a bus 168. Alternatively, the processing device 162 may be connected to the main memory 164 and/or the static memory 166 directly or via some other connectivity means.

The processing device 162 represents one or more processing devices, such as a microprocessor, central processing unit (CPU), or the like. More particularly, the processing device 162 may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The processing device 162 is configured to execute processing logic in instructions 170 and/or cached instructions 172 for performing the operations and steps discussed herein.

The computer system 160 may further include a communications interface in the form of a network interface device 174. It also may or may not include an input 176 to receive input and selections to be communicated to the computer system 160 when executing the instructions 170, 172. It also may or may not include an output 178, including but not limited to display(s) 180. The display(s) 180 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 160 may or may not include a data storage device 182 that includes using drive(s) 184 to store the functions described herein in a computer-readable medium 186, on which is stored one or more sets of instructions 188 (e.g., software) embodying any one or more of the methodologies or functions described herein. The functions can include the methods and/or other functions of the processing system 158, a participant user device, and/or a licensing server, as non-limiting examples. The one or more sets of instructions 188 may also reside, completely or at least partially, within the main memory 164 and/or within the processing device 162 during execution thereof by the computer system 160. The main memory 164 and the processing device 162 also constitute machine-accessible storage media. The instructions 170, 172, and/or 188 may further be transmitted or received over a network 190 via the network interface device 174. The network 190 may be an intra-network or an inter-network.

While the computer-readable medium 186 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 188. The term "machine-accessible storage medium" shall also be taken to include any medium that is capable of storing, encoding, or carrying a set of instructions 170, 172, and/or 188 for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing a back-to-back virtual Web Real-Time Communications (WebRTC) agent, comprising:
   receiving, by a WebRTC server executing on a computing device, a WebRTC offer/answer exchange between a first WebRTC client and a second WebRTC client;
   determining whether the first WebRTC client and the second WebRTC client are compatible based on the WebRTC offer/answer exchange, a query/response exchange between the WebRTC server and one or more of the first WebRTC client and the second WebRTC client, or Hyper Text Transfer Protocol (HTTP) header data, or a combination thereof;
   instantiating one or more virtual WebRTC agents, wherein instantiating the one or more virtual WebRTC agents comprises, responsive to determining that the first WebRTC client is not compatible with the second WebRTC client:
      instantiating a first virtual WebRTC agent compatible with the first WebRTC client; and
      instantiating a second virtual WebRTC agent compatible with the second WebRTC client;
   establishing a first WebRTC interactive flow between the first WebRTC client and the first virtual WebRTC agent, and a second WebRTC interactive flow between the second WebRTC client and the second virtual WebRTC agent; and
   directing an interactive media content of the first WebRTC interactive flow to the second WebRTC interactive flow, and an interactive media content of the second WebRTC interactive flow to the first WebRTC interactive flow, via the virtual WebRTC agents.

2. The method of claim 1, further comprising extracting the interactive media content from the first WebRTC interactive flow or the interactive media content from the second WebRTC interactive flow, or a combination thereof.

3. The method of claim 1, further comprising injecting content into the first WebRTC interactive flow or the second WebRTC interactive flow, or a combination thereof.

4. The method of claim 1, further comprising recording the interactive media content of the first WebRTC interactive flow or the interactive media content of the second WebRTC interactive flow, or a combination thereof.

5. The method of claim 1, further comprising transforming the interactive media content of the first WebRTC interactive flow or the interactive media content of the second WebRTC interactive flow, or a combination thereof.

6. The method of claim 1, wherein the first and second virtual WebRTC agents comprise web browser applications executing within a virtual instance of an operating system.

7. A system for providing a back-to-back virtual Web Real-Time Communications (WebRTC) agent, comprising:
   at least one communications interface; and
   a WebRTC server associated with the at least one communications interface, the WebRTC server comprising a WebRTC application provider configured to receive a WebRTC offer/answer exchange between a first WebRTC client and a second WebRTC client; and
   the WebRTC server configured to determine whether the first WebRTC client and the second WebRTC client are compatible based on the WebRTC offer/answer exchange, a query/response exchange between the WebRTC server and one or more of the first WebRTC client and the second WebRTC client, or Hyper Text Transfer Protocol (HTTP) header data, or a combination thereof;
   instantiating one or more virtual WebRTC agents, wherein instantiating the one or more virtual WebRTC agents comprises, responsive to determining that the first WebRTC client is not compatible with the second WebRTC client:
   the WebRTC server further comprising a virtual WebRTC agent manager programmed to:
      instantiate a first virtual WebRTC agent compatible with the first WebRTC client; and
      instantiate a second virtual WebRTC agent compatible with the second WebRTC client;
      establish a first WebRTC interactive flow between the first WebRTC client and the first virtual WebRTC agent, and a second WebRTC interactive flow between the second WebRTC client and the second WebRTC agent; and
      direct an interactive media content of the first WebRTC interactive flow to the second WebRTC interactive flow, and an interactive media content of the second WebRTC interactive flow to the first WebRTC interactive flow, via the virtual WebRTC agents.

8. The system of claim 7, wherein the virtual WebRTC agent manager is further configured to extract the interactive media content from the first WebRTC interactive flow or the interactive media content from the second WebRTC interactive flow, or a combination thereof.

9. The system of claim 7, wherein the virtual WebRTC agent manager is further configured to inject content into the first WebRTC interactive flow or the second WebRTC interactive flow, or a combination thereof.

10. The system of claim 7, wherein the virtual WebRTC agent manager is further configured to record the interactive media content of the first WebRTC interactive flow or the interactive media content of the second WebRTC interactive flow, or a combination thereof.

11. The system of claim 7, wherein the virtual WebRTC agent manager is further configured to transform the interactive media content of the first WebRTC interactive flow or the interactive media content of the second WebRTC interactive flow, or a combination thereof.

12. A non-transitory computer-readable medium having stored thereon computer-executable instructions to cause a processor to implement a method, comprising:
  receiving a Web Real-Time Communications (WebRTC) offer/answer exchange between a first WebRTC client and a second WebRTC client;
  determining whether the first WebRTC client and the second WebRTC client are compatible based on the WebRTC offer/answer exchange, a query/response exchange between the WebRTC server and one or more of the first WebRTC client and the second WebRTC client, or Hyper Text Transfer Protocol (HTTP) header data, or a combination thereof;
  instantiating one or more virtual WebRTC agents, wherein instantiating the one or more virtual WebRTC agents comprises, responsive to determining that the first WebRTC client is not compatible with the second WebRTC client:
    instantiating a first virtual WebRTC agent compatible with the first WebRTC client; and
    instantiating a second virtual WebRTC agent compatible with the second WebRTC client;
  establishing a first WebRTC interactive flow between the first WebRTC client and the first virtual WebRTC agent, and a second WebRTC interactive flow between the second WebRTC client and the second virtual WebRTC agent; and
  directing an interactive media content of the first WebRTC interactive flow to the second WebRTC interactive flow, and an interactive media content of the second WebRTC interactive flow to the first WebRTC interactive flow, via the virtual WebRTC agents.

13. The non-transitory computer-readable medium of claim 12 having stored thereon the computer-executable instructions to cause the processor to implement the method, further comprising extracting the interactive media content from the first WebRTC interactive flow or the interactive media content from the second WebRTC interactive flow, or a combination thereof.

14. The non-transitory computer-readable medium of claim 12 having stored thereon the computer-executable instructions to cause the processor to implement the method, further comprising injecting content into the first WebRTC interactive flow or the second WebRTC interactive flow, or a combination thereof.

15. The non-transitory computer-readable medium of claim 12 having stored thereon the computer-executable instructions to cause the processor to implement the method, further comprising recording the interactive media content of the first WebRTC interactive flow or the interactive media content of the second WebRTC interactive flow, or a combination thereof.

16. The non-transitory computer-readable medium of claim 12 having stored thereon the computer-executable instructions to cause the processor to implement the method, further comprising transforming the interactive media content of the first WebRTC interactive flow or the interactive media content of the second WebRTC interactive flow, or a combination thereof.

17. The non-transitory computer-readable medium of claim 12 having stored thereon the computer-executable instructions to cause the processor to implement the method, wherein the first and second virtual WebRTC agents comprise web browser applications executing within a virtual instance of an operating system.

18. The system of claim 7, wherein the first and second virtual WebRTC agents comprise web browser applications executing within a virtual instance of an operating system.

19. The method of claim 1, wherein the first and second WebRTC interactive flows comprise a real-time audio stream and/or a real-time video stream.

20. The system of claim 7, wherein the first and second WebRTC interactive flows comprise a real-time audio stream and/or a real-time video stream.

* * * * *